United States Patent
Hirosawa et al.

(10) Patent No.: US 6,763,393 B2
(45) Date of Patent: Jul. 13, 2004

(54) RESERVED REQUEST TYPE OF SEARCHED INFORMATION DISTRIBUTION SERVER

(75) Inventors: Toshio Hirosawa, Machida (JP); Tsutomu Ito, Tsukui-gun (JP); Yoshihiro Ishii, Fussa (JP); Minoru Hidaka, Kodaira (JP)

(73) Assignees: Hitachi, Ltd., Tokyo (JP); Hitachi Information Network, Ltd., Tokyo (JP)

( * ) Notice: Subject to any disclaimer, the term of this patent is extended or adjusted under 35 U.S.C. 154(b) by 273 days.

(21) Appl. No.: 10/005,357

(22) Filed: Dec. 7, 2001

(65) Prior Publication Data

US 2002/0042811 A1 Apr. 11, 2002

Related U.S. Application Data

(63) Continuation of application No. 09/250,154, filed on Feb. 16, 1999.

(30) Foreign Application Priority Data

Feb. 19, 1998 (JP) ............................................ 10-036999

(51) Int. Cl.[7] .......................................... G06F 15/173
(52) U.S. Cl. ................................... 709/235; 709/219
(58) Field of Search .............................. 370/432, 338; 709/219, 245, 235

(56) References Cited

U.S. PATENT DOCUMENTS

| 5,790,935 | A | | 8/1998 | Payton ........................ 725/91 |
|---|---|---|---|---|
| 5,852,721 | A | | 12/1998 | Dillon et al. ................ 709/217 |
| 5,978,381 | A | | 11/1999 | Perlman et al. ............. 370/432 |
| 6,105,060 | A | * | 8/2000 | Rothblatt ..................... 709/219 |
| 6,160,797 | A | | 12/2000 | Robert, III et al. ......... 370/316 |
| 6,266,339 | B1 | * | 7/2001 | Donahue et al. ............ 370/432 |
| 6,275,496 | B1 | | 8/2001 | Bruns et al. ................. 370/429 |
| 6,415,329 | B1 | * | 7/2002 | Gelman et al. ............. 709/245 |
| 6,519,243 | B1 | * | 2/2003 | Nonaka et al. ............. 370/338 |

FOREIGN PATENT DOCUMENTS

| JP | 8287095 | 11/1996 |
|---|---|---|
| JP | 934762 | 2/1997 |
| JP | 9218815 | 8/1997 |
| JP | 9311802 | 12/1997 |
| JP | 1011373 | 1/1998 |
| JP | 1040180 | 2/1998 |

OTHER PUBLICATIONS

E. Krol, "The Whole Internet User's Guide and Catalog", O'Reilly Associates, Inc.

* cited by examiner

Primary Examiner—John Follansbee
Assistant Examiner—Jungwon Chang
(74) Attorney, Agent, or Firm—Antonelli, Terry, Stout & Kraus, LLP

(57) ABSTRACT

The reserved request type of searched information distribution server having a first function unit for issuing a search request to another server connected to the Internet via the Internet so as to collect desired data from a WWW server specified by the search request according to the schedule specified by the search request when receiving request of data searching in a WWW server from a client terminal, and a second function unit for receiving searched data via a communication satellite.

4 Claims, 2 Drawing Sheets

| RQ | CONTENTS OF REQUEST | SOURCE OF REQUEST |
|---|---|---|
| 1 | RESERVED SEARCH REQUEST | CLIENT |
| 2 | DIRECT SEARCH REQUEST | CLIENT |
| 3 | STATUS CHECK REQUEST | CLIENT |
| 4 | URL DATA RECEIVING REQUEST | CLIENT |
| 5 | DATA RELOAD REQUEST | SATELLITE SERVER |

RESERVED REQUEST TYPE OF SEARCHED INFORMATION DISTRIBUTION SERVER

This is a continuation of application Ser. No. 09/250,154, filed Feb. 16, 1999.

BACKGROUND OF THE INVENTION

1. Field of the Invention

The present invention relates to a method and a system for searching and collecting data from information providing servers, that is, World Wide Web (WWW) servers through the Internet. More particularly, the present invention is related to a method and a system for searching data requested from a plurality of client terminals collectively at fixed intervals of time (at fixed times) according to the reserved search requests from those client terminals and distributing searched data to each of those client terminals.

2. Description of Related Art

Now that the use of the Internet has come into an explosive increase, it is possible to access World Wide Web (WWW) servers, which are information providing servers connected to the Internet, from any place in the world. The Internet and the WWW are described in detail in the following publications.

(1) Internet User's Guide; written by Ed Krol, translated by Jun Murai, and published by Tomson Publishing Japan.

(2) The Whole Internet; written by Ed Krol and published by Oreilly Associates, Inc. which is an original of the publication (1).

If an Internet user makes an attempt to obtain data from a WWW server, for example, using a client terminal, which is a personal computer (PC) or a work station (WS) so as to collect data distributed throughout the world, the user may have to wait for a long time until he/she obtains desired data after he/she issues a request depending on the operation hour and the object WWW server. This problem may also occur in the following cases; when the accessed Internet route is insufficient in capacity to cope with the access speed, when accesses to a specific WWW server are over-concentrated, and when the access is made via a specific relay point (generally, it is also referred to as a hub).

Now that the Internet allows data to be searched from WWW servers disposed distributively throughout the world, such the advantage of the Internet should be used more practically.

Using a communication satellite will be one of the effective methods for obtaining data from Internet WWW servers at high speeds. Such two-way communications, however, require an expensive transmitting facility. Practically, therefore, such a communication satellite is usually used only for receiving data from WWW servers.

On the other hand, the user may search and collect data regularly and search and collect non-emergency data from WWW servers connected to the Internet at fixed intervals of time. In such non-real time data searching, it would be convenient if it is possible that reserved search requests are registered beforehand so that WWW servers are accessed at fixed intervals of time, although such a function is not realized yet.

SUMMARY OF THE INVENTION

Under such the circumstances, it is an object of the present invention to provide a method and a system that can reserve a search item beforehand from a client terminal and distribute data searched from an object Internet WWW server according to the reserved search item to the client terminal collectively at fixed intervals of time when searched information is to be obtained from an information providing server connected to the Internet.

It is another object of the present invention to provide a method and a system that can receive searched data collectively from an object Internet WWW server at fixed intervals of time via a communication satellite and distribute received searched data to the request source client terminal.

In order to achieve the above mentioned objects, the reserved request type of information search and distribution system of the present invention is provided with a searching server and a satellite communication server so that the system can process reserved search requests from client terminals.

Receiving a reserved search request from a client terminal, the searching server searches specified data from each WWW server connected to the Internet and saves searched data in a cache file provided in the searching server. After this, the system transmits collected searched data to the client terminal sequentially.

According to the present invention, collected data is transmitted to the object client terminal, for example, at 12 a.m., at 8 a.m., at noon, at 5 p.m. every day, or when the client terminal is connected to the searching server.

Furthermore, the above mentioned searching server is provided with a function for communicating with a network access center of the Internet so that the server can issue reserved search requests from a plurality of client terminals collectively to the network access center, and the network access center operates to search and collect data from WWW servers connected to the Internet.

Such a network access center is convenient to search and collect data from object WWW servers instead of a searching server when those WWW servers exist in a specific relay point or in a specific relay area in a different country in which the searching server does not exist, for example, when the searching server exists in Japan and the object WWW servers and the network access center exist in the United States of America.

The data searched and collected by the network access center from WWW servers is transmitted to a satellite communication server via a communication satellite. The satellite communication server transfers the received data to the searching server sequentially. The searching server saves data received from the satellite communication server in a cache file sequentially. Then, in a fixed time, the searching server reads the data from the cache file and transmits it to the object client terminal.

According to the present invention, by using the satellite communication server as a communication unit for exclusively receiving the searched data from the communication satellite, the data searched from WWW servers existing in a specific relay area can be received collectively at a high speed so as to reduce the required searching and collecting time significantly.

DESCRIPTION OF THE PREFERRED EMBODIMENTS

Hereunder, the reserved request type of information search and distribution system of the present invention will be described in detail with reference to a preferred embodiment shown in the accompanying drawings.

Figure 1:
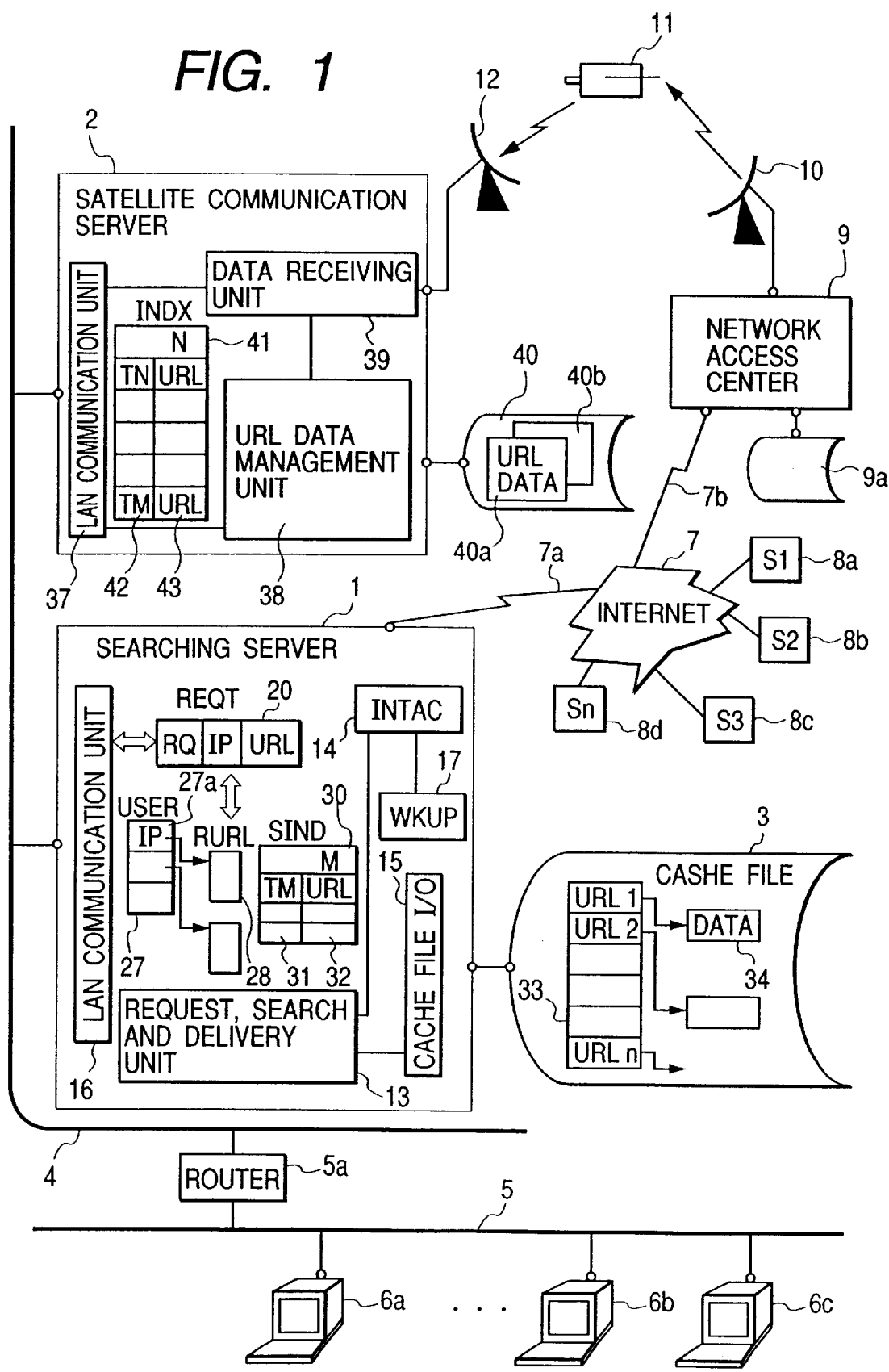
FIG. 1 is a functional block diagram of a reserved request type of information search and distribution system of the present invention.

In FIG. 1, the reserved request type of information search and distribution system of the present invention is provided with a searching server 1 and a satellite communication server 2. A cache file 3 is connected to the searching server 1. Both the searching server 1 and satellite communication server 2 are connected to each other via a network, for example, a local area network (LAN) 4. The servers 1 and 2 are also connected to client terminals 6a to 6c via a LAN 5 and a router 5a.

Each of the client terminals 6a to 6c, etc. is provided with a communication function. The client terminal may be a personal computer (PC) or a work station (WS). An operating system OS (not illustrated) provided with communication functions is running in both of the searching server 1 and the satellite communication server 2.

In the searching server 1 for realizing both method and system of the present invention for searching and distributing reserved request type of information are running a request, search, and delivery unit 13, an Internet access processing unit (INTAC) 14, a cache file input/output processing unit 15, a LAN communication unit 16, and a wake-up processing unit (WKUP) 17 for starting up the above mentioned Internet access processing unit 14 at fixed intervals of time.

Figures 2, 3:
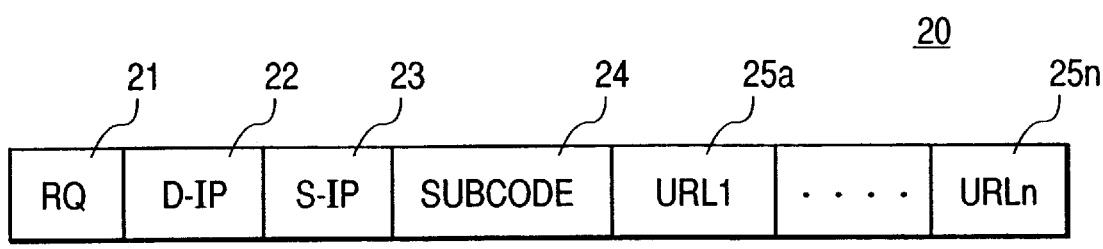
FIG. 2 is a format of a request data block to be communicated between a searching server and a client terminal, as well as between a searching server and a satellite communication server.
FIG. 3 shows the correspondence between types of request codes and request contents in a request data block.

FIG. 2 shows an example of the format of a request data block (REQT) 20 transmitted from client terminals 6a to 6c, etc. to the searching server 1.

The request data block 20 comprises a request code 21, a destination IP address 22, a source IP address 23, a sub-code 24, and the URL (Universal Request Locator) of each of object WWW servers S1 to Sn. For details of the URL, refer to the above mentioned publications.

FIG. 3 shows the correspondence between the types of request codes 21 and request contents in the request data block 20 shown in FIG. 2.

Receiving this request data block 20, the reserve, search, and delivery unit 13 checks the request code 21 in the request data block thereby to execute a processing according to the request content shown in FIG. 3.

(1) Reserved search request (RQ=1)

This request is issued to register the request content of the client terminal 6a in a user table (USER) 27. When registering the request content, the S-IP field 23 of the request data block 20 for setting a source IP address is corresponded to the IP 27a in the user table 27 and the URL fields 25a to 25n to the RURL 28 respectively.

In the sub-code field 24, a searching mode, for example, searching at a fixed time or searching at fixed intervals of time is specified. This searching mode information is also saved in the user table 27. A source IP address set in the S-IP field 23 is the address of the client terminal 6a. This address value is decided uniquely as a TCP/IP (Transmission Control Protocol/Internet Protocol) address value on an object LAN. The TCP/IP is also described in detail in the above mentioned publications. The TCP/IP address value of the searching server 1 is set in the S-IP field 23 of the request data block 20.

(2) Direct search request (RQ=2)

In order to obtain the URL information specified by URL1 to URLn, the reserve, search, and delivery unit 13 issues this direct search request immediately to the WWW servers 8a to 8d connected to the Internet 7 respectively. At this time, if caching is specified in the sub-code field 24, the unit 13 checks the searched data management table (SIND) 30.

If there is a URL 32 which is equal to the specified URL1:25a, it means that the URL 32 is already saved in the cache file 3. Thus, the unit 13 reads the data 34 corresponding to the URL1 in the cache file 3 and transmits the data 34 to the client terminal 6a via the LAN 4.

If no caching is specified in the sub-code field 24 or if the specified URL is not registered in the searched data management table 30, then the unit 13 starts up the Internet access processing unit 14 so that this Internet access processing unit 14 issues a request to the WWW servers 8a to 8d so as to search and collect the specified URL from those WWW servers connected to the Internet 7. For example, if a WWW server having the data of the requested URL 25a is the WWW server 8a, the requested data is returned from this WWW server 8a via the Internet 7.

The reserve, search, and delivery unit 13 provided in the searching server 1 registers the data received time TM 31 and the URL 32 in the searched data management table 30, saves the received data in the cache file 3, and transmits the searched data to the request source client terminal 6a via the LAN 4, the router 5a, and the LAN 5. The reason why caching is made such way in the searching server 1 is to make it faster to process the next request and the same URL search request issued from other client terminals 6b and 6c.

(3) Status check request (RQ=3)

This request is issued from the client terminal 6a, etc. to inquire of the searching server 1 about the searching status. If this request is issued, the reserve, search, and delivery unit 13 checks both user management table 27 and searched data management table 30 thereby to check if the latest URL data requested by the client terminal 6a is already received or not.

If the URL data is already received, the unit 13 notifies the client terminal 6a of the result by transmitting the request data block 20 to the client terminal 6a. In the request data block 20, the address of the client terminal and the address of the searching server address 1 are set in the D-IP field 22 and in the S-IP field 23 respectively, and "latest data present" is marked in the sub-code field 24.

If the latest URL data is not received yet, "latest data not present" is marked in the sub-code field 24 before the request data block 20 is transmitted to the client terminal 6a.

(4) URL data receiving request (RQ=4)

Receiving this request from the client terminal 6a, the reserve, search, and delivery unit 13 obtains URL data from the RURL 28 of the IP 27a corresponding to the address of the client terminal registered in the user management table 27, then transmits the data 34 of the URL 33, which matches with the URL 32 in the searched data management table 30, from the cashe file 3 to the client terminal 6a.

(5) Data reload request (RQ=5)

This request is issued from the satellite communication server 2. Receiving this request from the satellite communication server 2, the reserve, search, and delivery unit 13 prepares for receiving the latest URL data 40a and the data received time (TM) 42 from the satellite communication server 2. Hereafter, the unit 13 receives the data received time 42, the URL 43, and the data 40a and 40b sequentially from the satellite communication server 2 thereby to update the searched data management table 30, the table 33 and the data 34 in the cache file 3 respectively.

Next, the operation of the reserved searching function, which is one of the features of the present invention, will be described.

The searching server 1 controls the reserved searching function. The wake-up processing unit (WKUP) 17 provided in the searching server 1 starts up the Internet access processing unit 14 at every fixed time, for example, at 12 a.m., at 8 a.m., at noon, or at 5 p.m. every day. The wake-up processing unit (WKUP) 17 may also start up the Internet access processing unit 14 at fixed intervals of time.

The Internet access processing unit 14, when started up from the wake-up processing unit (WKUP) 17, fetches RURL 28 registered in the user management table 27 and instructs the network access center 9 to search URL data collectively from the WWW servers 8a to 8n.

The network access center 9 existing at a specific relay point or in a specific relay area then searches the data corresponding to the specified URL and saves the searched data in a file 9a temporarily. After this, the center 9 transmits the searched data to the satellite communication server 2 via the transmission antenna 10, then via the communication satellite 11 and the reception antenna 12.

The data receiving unit 39 provided in the satellite communication server 2 passes received data to the URL data management unit 38. The URL data management unit 38 saves URL data 40a and 40b in a file unit 40 thereby to create an index table 41. In the index table 41 are saved the data received time 42 and the URL address 43 of the received data. After this, the URL data management unit 38 issues a data reload request (RQ=5) shown in FIG. 2 and FIG. 3 to the searching server 1 via the LAN communication unit 37.

Receiving the data reload request from the satellite communication server 2, the reserve, search, and delivery unit 13 provided in the searching server 1 prepares for receiving the latest URL data 40a and the data received time 42 from the satellite communication server 2. Hereafter, the unit 13 receives the data received time 42 and the URL 43 set in the index 41, as well as the data 40a and 40b sequentially from the satellite communication server 2 thereby to update the searched data management table 30, as well as the table 33 and the data 34 in the cache file 3 respectively.

After this, the reserve, search, and delivery unit 13 transmits the data 34 corresponding to the RURL 28 to the client terminals 6a, 6b, 6c, etc. via the LAN 4, the router 5a, and the LAN 5 for each reserve request issued from a client terminal, that is, for each IP address 27a of a client terminal registered in the user table 27. The delivery unit 13 responses "latest data present" to the object client terminal if a status check request (EQ=3) shown in FIG. 2 and FIG. 3 is issued from the client terminal.

In the embodiment shown in FIG. 1, the client terminals 6a to 6c are connected to the network LAN 5. However, the above mentioned operation of the reserved searching function is also executed if those client terminals 6a to 6c are connected to the searching server 1 via a public network respectively. In addition, the present invention can also be used in any network environment if a computer program that executes the above mentioned method of the present invention is recorded in a recording medium.

According to the present invention, the latest data can be collected automatically at fixed intervals of time if reserved search requests are registered beforehand when data that is not needed urgently and can be searched any time is to be searched and collected from WWW servers connected to the Internet. It is thus possible to solve the above mentioned conventional problem that the response time to such a search request is very slow.

Furthermore, according to the present invention, reserved search requests issued from a plurality of users, that is, client terminals can be processed collectively and collected data can be received collectively by a network access center existing in a specific relay area (hub area) through a route independent of the Internet, more concretely, via a route that uses a communication satellite exclusively. It is thus possible to reduce the request processing time significantly when in a batched transfer processing.

What is claimed is:

1. A reserved request type of searched information distribution system, comprising:

a first server connected between a plurality of client terminals and the internet to which a plurality of Web servers are connected; and a second server configured so as to communicate with said first server via a network and to receive Web content data from a network access server via a communication satellite, said network access server being connected to the internet;

wherein said first server comprises:

means for requesting said network access server to collect Web content data from at least one of said Web servers specified in accordance with a first search request received from one of said client terminals requesting a reserved search of desired data, a cache file for storing Web content data received from said second server, and means for distributing Web content data corresponding to said first search request to a client terminal which issued the first search request, said Web content data to be distributed are retrieved from said cache file, and wherein said second server comprises:

means for receiving Web content data from said network access server via the communication satellite and transferring the received Web content data to said first server via the network.

2. A reserved request type of searched information distribution system, comprising:

a first server having a cache file for storing Web content data and a controller for requesting a network access server, which is connected to Web servers through the Internet, to search and collect desired Web content data designated in a first search request received from one of a plurality of client terminals connected to the first server via a network; and a second server having means for receiving Web content data from said network access server via a communication path independent of the Internet and for transferring the received Web content data to said first server, wherein said first server stores the Web content data received from said second server in said cache file in association with a source identifier thereof and said controller selectively distributes the Web content data to one of said client terminals in response to a data request from the client terminal.

3. A reserved type of searched information distribution system according to claim 2, wherein said first server is provided with a management table for registering a relation between an address of the client terminal which issued said first search request and a source identifier of Web content data specified in the first search request, said controller carries out distribution of the Web content data by retrieving Web content data from said cache file based on the source identifier read out from said management table in accordance with an address of the client terminal which issued said data request.

4. A reserved request type of searched information distribution system according to claim 2, said controller of the first server requests said network access server to search and collect the desired Web content data at a timing determined in accordance with a search mode designated in the first search request.

* * * * *